United States Patent
Sukumar et al.

(10) Patent No.: US 12,501,565 B2
(45) Date of Patent: Dec. 16, 2025

(54) CASES AND EARBUDS FOR PROVIDING INFORMATION AND ELECTRONIC DEVICES FOR RECEIVING INFORMATION

(71) Applicant: Apple Inc., Cupertino, CA (US)

(72) Inventors: Hariharan Sukumar, San Diego, CA (US); Chandrahas Aralaguppe Chandramohan, San Jose, CA (US); Angelo K. Maliyil, San Diego, CA (US); Vaishnavi Dhulkhed, San Francisco, CA (US); Ke Liu, Los Altos, CA (US); Alejandro A. Rodriguez, Saratoga, CA (US); Vasilios E. Anton, San Francisco, CA (US); Chen Ganir, San Jose, CA (US)

(73) Assignee: Apple Inc., Cupertino, CA (US)

( * ) Notice: Subject to any disclaimer, the term of this patent is extended or adjusted under 35 U.S.C. 154(b) by 105 days.

(21) Appl. No.: 18/087,694

(22) Filed: Dec. 22, 2022

(65) Prior Publication Data
US 2024/0215186 A1    Jun. 27, 2024

(51) Int. Cl.
*H05K 5/02* (2006.01)
*G06F 1/16* (2006.01)
*H04R 1/10* (2006.01)
*H05K 5/00* (2006.01)

(52) U.S. Cl.
CPC ......... *H05K 5/0247* (2013.01); *G06F 1/1613* (2013.01); *H04R 1/1091* (2013.01); *H05K 5/0086* (2013.01); *H04R 2201/10* (2013.01)

(58) Field of Classification Search
CPC .......................... H04R 1/1091; H04R 2201/10
See application file for complete search history.

(56) References Cited

U.S. PATENT DOCUMENTS

| | | | |
|---|---|---|---|
| 7,548,040 B2 | 6/2009 | Lee et al. | |
| 10,609,198 B2 * | 3/2020 | Kim | H04R 1/1016 |
| 10,701,197 B2 * | 6/2020 | Kim | H04R 1/1041 |
| 2017/0264987 A1 * | 9/2017 | Hong | H04R 1/1091 |
| 2021/0152036 A1 | 5/2021 | Sun et al. | |
| 2022/0107771 A1 | 4/2022 | Behzadi et al. | |
| 2023/0275986 A1 * | 8/2023 | Liu | H04M 1/72412 455/420 |

* cited by examiner

*Primary Examiner* — Suhan Ni
(74) *Attorney, Agent, or Firm* — BAKERHOSTETLER

(57) ABSTRACT

An electronic device can receive battery charge level information from two different devices and select, between the different devices, which information to use to generate and present battery information on a display of the electronic device. When two separate devices are transmitted by a case and an earbud (or earbuds), the electronic device can receive and select from one of two source based upon the state of the case and the state of the earbud(s). Alternatively, based upon the state of the case and the earbud(s), the electronic device can merge the information received from the case and the earbuds, while also determining from the merged information which respective device transmitted the respective information. Further, the case can provide battery information on behalf of the earbuds when the earbuds are in the case, and the respective radio circuits are shut down. Alternatively, the earbuds can provide battery information on behalf the case.

15 Claims, 5 Drawing Sheets

560

| Scenario | Case State | Earbud Location | Earbud information | Case information | Device Policy |
|---|---|---|---|---|---|
| 1 | Open | Docked | Earbud battery level, case battery level, earbud charging state, case charging state | Earbud battery level, case battery level, earbud charging state, case charging state, case state | Use earbud information |
| 2 | Open | Undocked | Earbud charging state | Case state, Case charging state | Merge |
| 3 | Closed | Docked | N/A | Earbud battery level, case battery level, earbud charging state, case charging state, case state | Use case information |
| 4 | Closed | Undocked | Earbud charging state, earbud battery level | Case charging state, case battery level, case state | Merge |

FIG. 5

CASES AND EARBUDS FOR PROVIDING INFORMATION AND ELECTRONIC DEVICES FOR RECEIVING INFORMATION

TECHNICAL FIELD

This application is directed to devices, and in particular, to electronic devices, cases, and earbuds that communicate battery charge level information and state information.

BACKGROUND

Some cases can store earbuds, and further, charge earbud batteries of the earbuds when the earbuds are stored in the case. Additionally, battery charge levels of the earbuds can be provided by the earbuds so long as the radio circuits of the earbuds are active. Otherwise, when the lid is closed and the earbuds are in the case, the earbud radio circuits are shut down and unable to transmit battery charge levels.

BRIEF DESCRIPTION OF THE DRAWINGS

Certain features of the subject technology are set forth in the appended claims. However, for purpose of explanation, several embodiments of the subject technology are set forth in the following figures.

FIG. 5 illustrates a table showing various states of a case and earbuds, as well as respective transmitted information by the case and earbuds and associated decisions by an electronic device, in accordance with aspects of the present disclosure.

DETAILED DESCRIPTION

Figure 1:
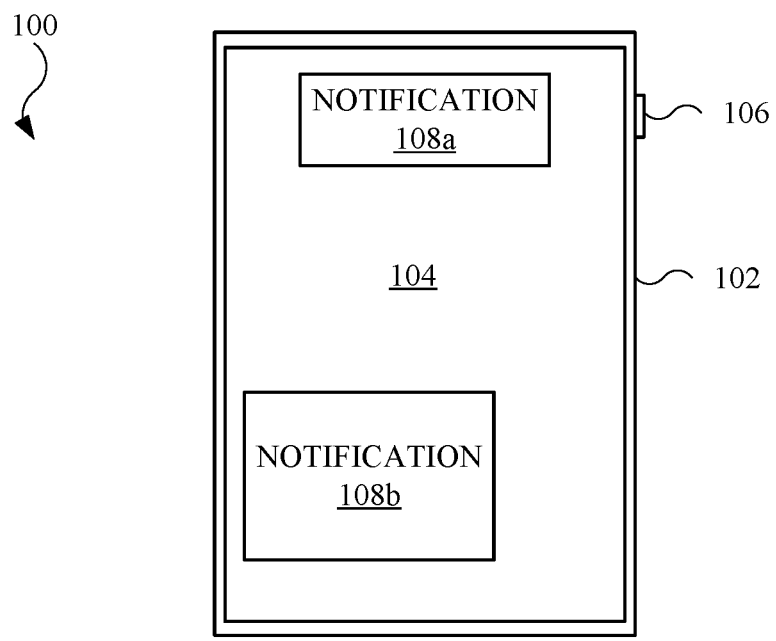
FIG. 1 illustrates an example embodiment of an electronic device, in accordance with aspects of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Aspects of the subject technology are directed to transmitting information between a case and earbuds (that can be stored in the case), as well as transmitting information to electronic device by the case and by the earbuds. For example, the case can transmit (e.g., broadcast or advertise), information (e.g., battery charge level) of respective batteries of the earbuds. Moreover, the case can transmit information related to the earbuds, even when the earbuds are incapable of transmitting themselves, such as when the respective batteries of the earbud batteries are insufficiently charged to power respective radio circuitry of the earbuds and/or when the earbud radio circuitry is powered down by the case. When the case is charging the respective batteries, the case can transmit a current battery charge level of each earbud battery in real time, or near real time. Alternatively, the case can replay (e.g., re-transmit) the respective battery charge levels when the earbuds are in the case but not charging. Beneficially, certain features (e.g., radio circuitry) of the earbuds can remain not in use (thus allowing the earbud batteries charge faster) while the case transmits information to an electronic device, which in turn can present current battery charge levels of the earbuds on a display for a user to view in real-time or near real-time.

In order for a case to obtain and transmit information from the earbuds, the case and the earbuds may, in a prior step, perform a handshake or authentication and pair with each other, thus forming a unitary identification between the case and the earbuds. The term "obtain" or "obtaining" may refer to a device receiving data from another device, or the performing a calculation, which may be based in part on the device's native features. For example, the earbuds may each share a key with the case, thus allowing the case to encrypt and decrypt information provided by the earbuds. Additionally, the key and the unitary identification can be shared with an electronic device, thus allowing the electronic device to determine a pairing between the case and the earbuds, and to decrypt information provided by the case on behalf of the earbuds.

Based on the pairing between the case and the earbuds, not only can the case transmit information related to the earbuds, but the earbuds can also transmit information on behalf of the case. For example, when at least one radio circuit of an earbud is active, the earbud can receive battery charge level of a case battery of the case and transmit the battery charge level of the case battery.

Additional aspects of the subject technology are directed to an electronic device receiving transmission from a case and one or more earbuds. For example, when radio circuits of the earbuds are powered on and actively transmitting information, the electronic device can receive respective earbud battery charge levels of the earbud batteries as well as case battery charge levels. However, the case can also transmit the same battery charge level information as that of the earbuds, thus providing the electronic device with duplicate battery charge level information.

In order to overcome this issue, the electronic device can use state information, or simply states, of the case and the earbuds to determine which information should be trusted as being accurate. For example, state information may include whether the earbuds are docked in the case or undocked from (i.e., outside of) the case. Additional state information may include whether the case (e.g., a lid of the case) is open or closed. The state information can be used as inputs to logic-based program (e.g., rules-based program) used by the electronic device to determines whether the information from the case is selected or the information from the one or more earbuds is selected. This may be useful when the case and earbuds provide overlapping, or duplicate, information. The selected information can be used by the electronic device to provide, as visual information on a display of the electronic device, one or more notifications related to the battery charge levels of the one or more earbud batteries and/or the case battery. Additionally, the state information can be used to determine whether to merge information from both the case and the earbuds, as the information provided by the case and the earbuds may be non-overlapping information.

These and other embodiments are discussed below with reference to FIGS. 1-5. However, those skilled in the art will readily appreciate that the detailed description given herein with respect to these Figures is for explanatory purposes only and should not be construed as limiting.

According to some embodiments, for example as shown in FIG. 1, an electronic device 100 can take the form of a mobile wireless communication device, such as a smartphone or a tablet computing device. The electronic device 100 includes a housing 102 and a display 104 coupled to the housing 102. The housing 102 may include a metal (including a metal alloy), a non-metal (e.g., plastic, glass, sapphire), or a combination thereof. The display 104 may include a capacitive touch input display that responds to inputs and gestures as commands to one or processors (not shown in FIG. 1).

The electronic device 100 further includes a button 106, representative of one or more additional buttons (not shown in FIG. 1). The button 106 is designed to actuate a switch (not shown in FIG. 1), which in turn provides a command to a processor circuit.

The display 104 can present visual information in the form of still images, motion images (e.g., video), and/or textual information. For example, the display 104 can present one or more notifications, such as a notification 108a and a notification 108b. In some embodiments, the notifications 108a and 108b include battery status information, such as a battery charge level and a charging state, of one or more external devices, such as a case and/or earbuds. This will be shown and described below.

Figure 2:
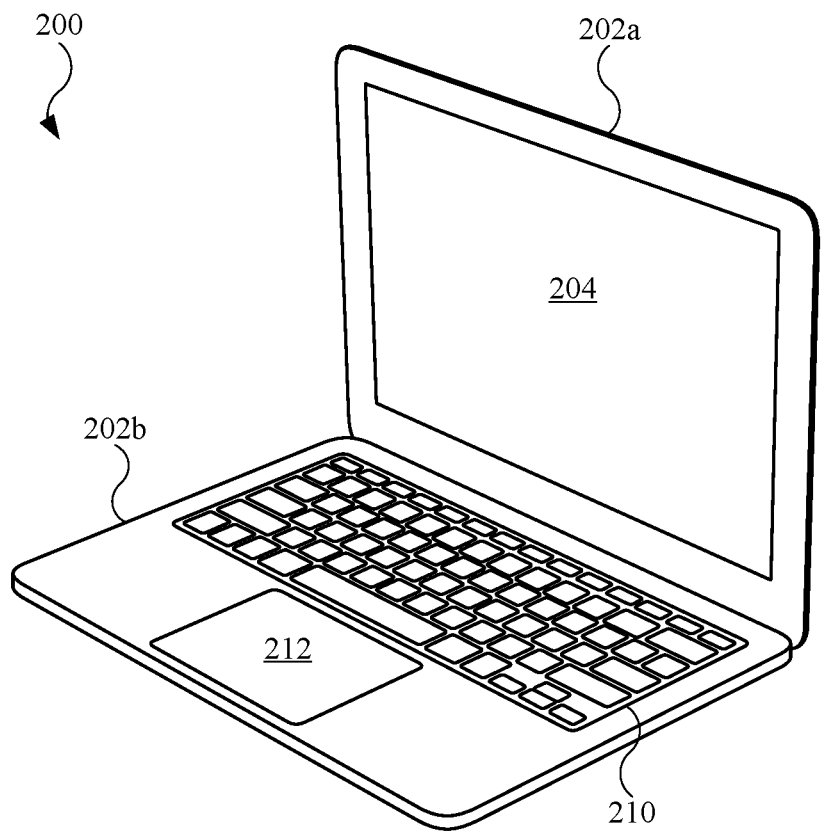
FIG. 2 illustrates an example alternate embodiment of an electronic device, in accordance with aspects of the present disclosure.

Referring to FIG. 2, an electronic device 200 can take the form of a laptop computing device. The electronic device 200 includes a housing component 202a and a housing component 202b rotationally coupled to the housing component 202a. The phrase "rotationally coupled" may refer to a component or structure attached to another component or structure by a hinge(s) (not shown), which allows rotational movement relative to the other component or structure. In some embodiments, the housing component 202a is a display housing and the housing component 202b is a base portion. The housing components 202a and 202b may include metals (including metal alloys), non-metals, or a combination thereof. The housing component 202a carries a display 204 designed to present visual information. The housing component 202b carries input mechanisms, such as a keyboard 210 and a track pad 212. Generally, the electronic device 200 and its components may include any features shown and described for the electronic device 100 (shown in FIG. 1).

FIGS. 3A-3D show and describe different states of a case and of earbuds used with the case. The various states shown in FIGS. 3A-3D can be transmitted to an electronic device shown and described herein.

Figure 3A:
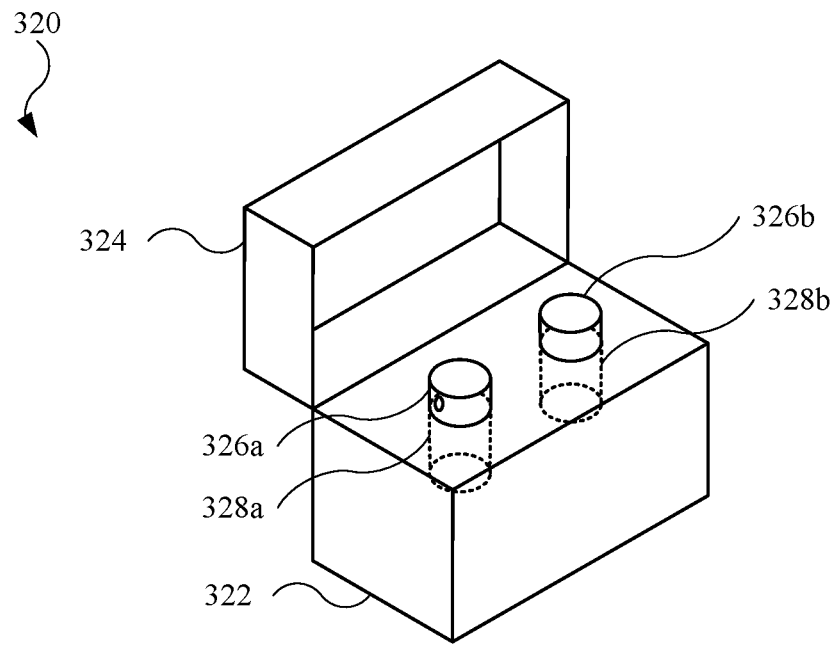
FIGS. 3A-3D illustrate different states for a case and earbuds, in accordance with aspects of the present disclosure.

Referring to FIG. 3A, a case 320 includes a case body 322 and a lid 324 coupled (e.g., rotationally coupled) to the case body 322. An earbud 326a and an earbud 326b are stored in a cavity 328a and a cavity 328b, respectively, of the case body 322. In some embodiments, the earbuds 326a and 326b, as well as other earbuds described herein, include wireless earbuds, with each of the earbuds 326a and 326b including one or more speakers used to convert electrical signals into audio signals, and in some cases, one or more microphones used to convert audio signals into electrical signals.

As shown in FIG. 3A, each of the earbuds 326a and 326b is in a docked state, based on the earbuds 326a and 326b being located in the case 320, and in particular, the cavities 328a and 328b, respectively, of the case 320. Additionally, the case 320 is in an open state, as the lid 324 is rotated away from the case body 322. It should be noted that while the case 320 may be described as being in the "open state," the open state can apply to the lid 324, i.e., the lid 324 is in the open state.

Figure 3B:
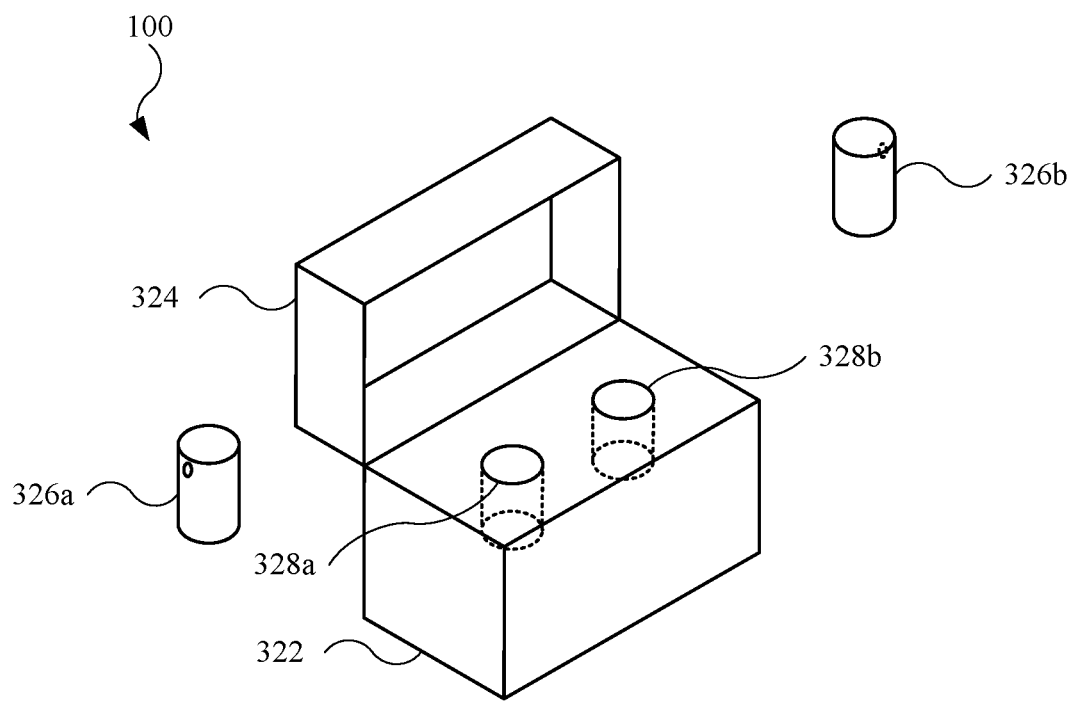

Referring to FIG. 3B, each of the earbuds 326a and 326b is in an undocked state, based on the earbuds 326a and 326b being located outside of the case 320, and in particular, outside of the cavities 328a and 328b, respectively, of the case 320. However, the case 320 remains in the open state, as the lid 324 remains rotated away from the case body 322.

Figure 3C:
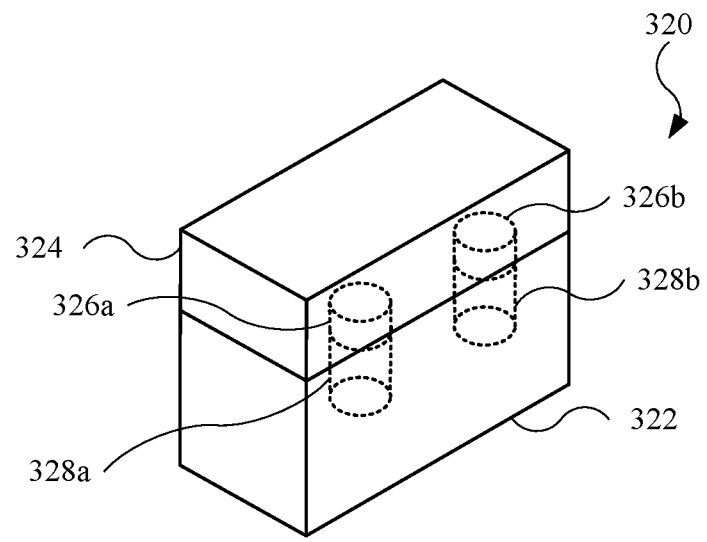

Referring to FIG. 3C, each of the earbuds 326a and 326b is in a docked state, based on the earbuds 326a and 326b being located in the case 320, and in particular, the cavities 328a and 328b, respectively, of the case 320. However, the case 320 is in a closed state, as the lid 324 is rotated toward the case body 322 and is covering at least the cavities 328a and 328b. It should be noted that while the case 320 may be described as being in the "closed state," the closed state can apply to the lid 324, i.e., the lid 324 is in the closed state.

Figure 3D:
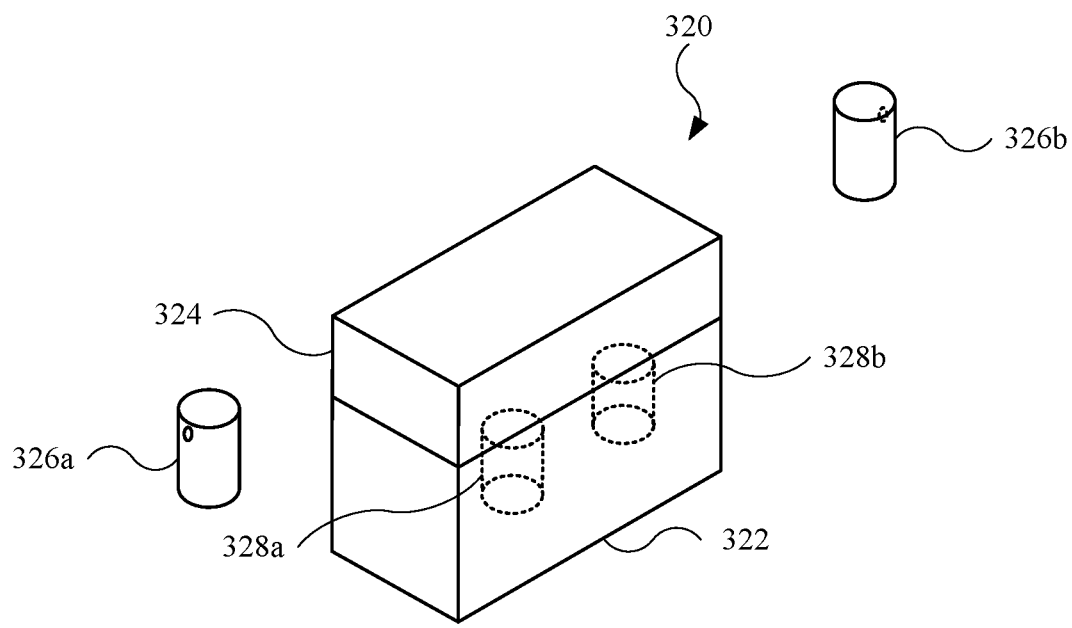

Referring to FIG. 3D, each of the earbuds 326a and 326b is in an undocked state, based on the earbuds 326a and 326b being located outside of the case 320, and in particular, outside of the cavities 328a and 328b, respectively, of the case 320. However, the case 320 remains in the closed state, as the lid 324 remains rotated toward the case body 322 and still covers at least the cavities 328a and 328b.

As will be discussed below, the case 320 not only provides a protective body for the earbuds 326a and 326b, but also includes a case battery (not shown in FIGS. 3A-3D) designed to act as a power source to supply power and charge respective earbud batteries (not shown in FIGS. 3A-3D) of the earbuds 326a and 326b while in the docked state of the earbuds 326a and 326b. The earbud battery charge level and the earbud charging state of each battery of the earbuds 326a and 326b can be transmitted by the case 320 to an electronic device (not shown in FIGS. 3A-3D). In some embodiments, the earbuds 326a and 326b also transmit the case battery charge level and the case charging state of the case battery of the case 320 in parallel with the transmission by the case 320. Additionally, the states of the case 320 (e.g., open state and closed states) and the states of the earbuds 326a and 326b (e.g., docked state and undocked stated) can also be transmitted as state information, in the form of data, by the case 320 and/or the earbuds 326a and 326b.

Additionally, in FIGS. 3A, 3B, and 3D, the earbuds 326a and 326b may still transmit information (e.g., battery charge levels) of their respective batteries, as the case 320 is in the open state (FIG. 3A), or due to the earbuds 326a and 326b being outside of the case 320 (FIGS. 3B and 3D) in the undocked state. However, in FIG. 3C, the case 320 can provide a command to power down the respective radio circuitry of the earbuds 326a and 326b when the earbuds 326a and 326b are in the case 320 (i.e., the docked state) and the case 320 is in the closed state. The case 320 can nonetheless receive information from the earbuds 326a and 326b and transmit the information on behalf of the earbuds 326a and 326b in real-time or near real-time. When the case 320 transitions from the closed state in FIG. 3C to the open state in FIG. 3A, the case 320 can provide a command to wake the respective radio circuitry of the earbuds 326a and 326b.

Figure 4:
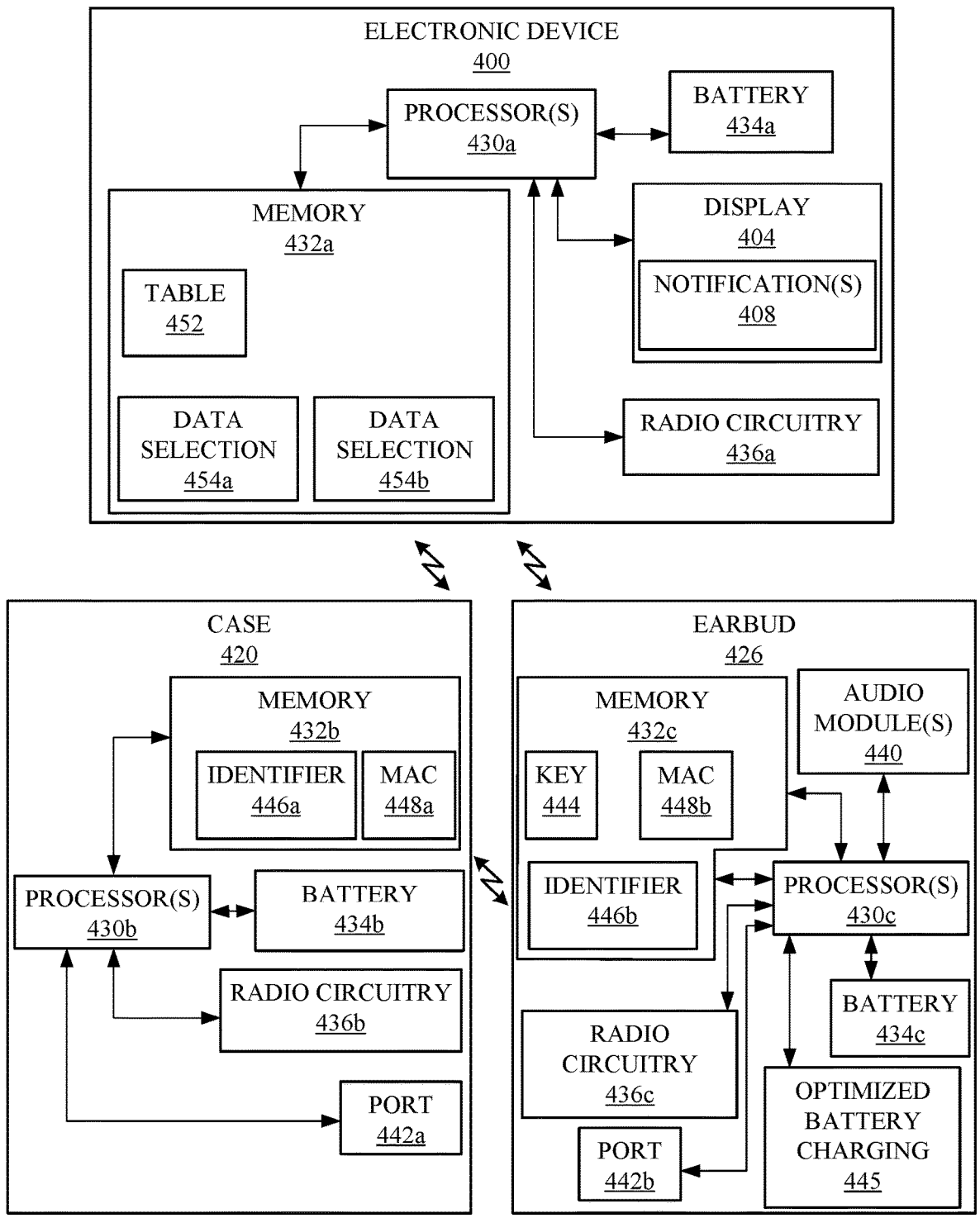
FIG. 4 illustrates a schematic diagram of an electronic device, a case, and an earbud, in accordance with aspects of the present disclosure.

Referring to FIG. 4, a schematic diagram of an electronic device 400, a case 420, and an earbud 426 illustrates various features, several of which may be included in other electronic devices, cases, and earbuds, respectively, shown and described herein. Also, while the earbud 426 represents a single earbud, an additional earbud mated with the earbud 426 to form a pair of earbuds, may include any features shown and described for the earbud 426.

As shown, each of the electronic device 400, the case 420, and the earbud 426 includes one or more processors 430a, one or more processors 430b, and one or more processors 430c, respectively. Each of the one or more processors 430a, 430b, and 430c may include an integrated circuit(s) with control circuitry, processing circuitry, central processing circuitry, one or more microcontrollers, one or more MEMS controllers, or a combination thereof. Accordingly, each of the one or more processors 430a, 430b, and 430c can carry out various processes, instructions, and/or algorithms for of their respective devices.

Additionally, each of the electronic device 400, the case 420, and the earbud 426 includes a memory 432a, a memory 432b, and a memory 432c, respectively. Each of the memories 432a, 432b, and 432c may include a memory device (or memory devices) that stores instructions and/or algorithms stored on read-only memory and/or random-access memory. Each of the one or more processors 430a, 430b, and 430c can execute, carry out, instructions and/or algorithms stored on the memories 432a, 432b, and 432c, respectively.

Also, each of the electronic device 400, the case 420, and the earbud 426 includes a battery 434a, a battery 434b, and a battery 434c, respectively. Each of the batteries 434a, 434b, and 434c may include a lithium-ion battery. However, other power sources are possible. Each of the batteries 434a, 434b, and 434c can power various components (of their respective devices) shown and described herein. Each of the batteries 434a, 434b, and 434c may include rechargeable batteries that can be charged and recharged. Also, the battery 434a, the battery 434b, and the battery 434c may be referred to as an electronic device battery, a case battery, and an earbud battery, respectively.

Also, each of the electronic device 400, the case 420, and the earbud 426 includes radio circuitry 436a, radio circuitry 436b, and radio circuitry 436c, respectively. Each of the radio circuitries 436a, 436b, and 436c may include wireless communication circuitry (e.g., controllers, antennas) used for communication with various protocols such as BLUETOOTH® (including Bluetooth Low Energy), WIFI®, cellular network (e.g., 4th Generation (4G) or 5th Generation (5G)), or a combination thereof. Based on the radio circuitries 436a, 436b, and 436c, the electronic device 400, the case 420, and the earbud 426, respectively, can communicate by sending/receiving information. Also, the radio circuitry 436a, the radio circuitry 436b, and the radio circuitry 436c may be referred to as electronic device radio circuitry, case radio circuitry, and earbud radio circuitry, respectively.

Also, the earbud 426 includes one or more audio modules 440. The one or more audio modules 440 may include one or more speakers used to convert electrical signals into audio signals, and in some cases, one or more microphones used to convert audio signals into electrical signals.

When the earbud 426 is placed in the case 420 (see, for example, FIGS. 3A and 3C), the battery 434b of the case 420 can charge the battery 434c of the earbud 426. In this regard, the case 420 and the earbud 426 include a port 442a and a port 442b, respectively. Using the ports 442a and 442b, the case 420 and the earbud 426 can establish a wired communication for charging. Additionally, the earbud 426 includes a key 444 that can be shared with the case 420. In some embodiments, the key 444 is shared via the ports 442a and 442b. In some embodiments, the key 444 is shared via the radio circuitries 436b and 436c. When the case 420 receives the key 444 from the earbud 426 (and a corresponding key from an additional earbud), the case 420 and the earbuds (i.e., earbud 426 and the additional earbud), can exchange information, via the radio circuitries 436b and 436c, in an encrypted manner that can be decrypted by the key 444 (and a duplicate of the key 444 stored on the case 420). Beneficially, when the key 444 is shared with the electronic device 400, the electronic device 400 can receive, using the radio circuitry 436a, both the case battery charge levels and earbud battery charge levels from the case 420 and/or the earbuds. The phrase "battery charge level" may refer to charge percentage (e.g., 25%, 50%, 100%) of a battery. Moreover, the earbuds can provide their respective earbud battery charge levels (e.g., battery 434c) to the case 420, and the case 420 can provide case battery charge levels of the battery 434c to the earbuds. Also, as the battery charge level changes (i.e., increases) when the battery 434b of the case 420 and the battery 434c of the earbud 426 are charging, the transmitted data packets from the case 420 and the earbud 426 can be updated to provide a current battery charge level of the batteries 434b and 434c in real-time or near real-time. Further, in some instances, the electronic device 400 may receive data packets with duplicate information related to both the battery charge levels of the batteries 434b and 443c from the case 420 and the earbud 426.

Additional information can also be transmitted. For example, the charging state of the case 420 and the earbud 426 can be transmitted. The phrase "charging state" may refer to a binary (e.g., charging or not charging) indication as to whether the battery is currently charging. Accordingly, both the battery charging level and the charging state can be transmitted. In this regard, the earbud 426 may include an optimized battery charging module 445 that determines whether to charge the earbud 426 when the earbud 426 is in the docked state and capable of being charged. In some embodiments, the optimized battery charging module 445 includes an algorithm that performs the steps of, for example, receiving or determining the time(s) of day a user is most likely going to use the earbud 426, receiving the battery charge level of the battery 434c of the earbud 426, determining the time needed to charge the battery 434c based on the battery charge level, determining the charging rate of the battery 434b of the case 420, and initiating a battery charge event based on the aforementioned steps to charge the battery prior to a likely time(s) the user will use the earbud 426. In this regard, the optimized battery charging module 445 may include machine-learning capabilities to determine the likely time(s) of use of the earbud 426 by receiving, recording, and/or using prior time(s) that the earbud 426 is used. Also, as the charging state the battery 434b of the case 420 and the battery 434c of the earbud 426 changes, the transmitted data packets from the case 420 and the earbud 426 can be updated to provide a current charging state of the batteries 434b and 434c in real-time or near real-time. Moreover, when the charging state indicates the battery 434c is not charging and in the docked state (due to, for example, the optimized battery charging module 445), the case 420 can replay the battery charge level, i.e., provide additional data packets on behalf of the earbud 426 indicating the battery charge level of the battery 434c of the earbud 426 remains constant.

Additionally, the state information of the case 420 and the earbud 426 can also be transmitted. For example, the open state and closed of the case 420, as well as the docked state or the undocked state of the earbud 426, can be transmitted. One or more data packets may be used to transmit the respective information.

In some embodiments, the one or more data packets can be sent multiple times by the case 420 and/or the earbud 426. This may be done to ensure the electronic device 400 receives the one or more data packets in a relatively short period of time, should the electronic device 400 not receive a prior set of data packets. Also, the rate, or frequency, at which the data packets are transmitted by the case 420 and the earbud 426 can change over time. For example, when a lid of the case 420 is opened, the case 420 and the earbud 426 may transmit at one rate for a duration beginning when the lid is opened, and then at a different rate after the duration. In some embodiments, the case 420 and the earbud 426 transmit at a rate within a range of 20 to 50 milliseconds for a duration in the range of 20 to 40 seconds beginning from when the lid was opened, and thereafter, the case 420 and the earbud 426 transmit at a rate within a range of 1 to 4 seconds.

Also, in some embodiments, the electronic device 400 receives respective data packets separately from the case 420 and the earbud 426. In this regard, the electronic device 400 may select either the data packet(s) from the case 420 or from the earbud 426. By selecting data packets from one device over the other, the electronic device 400 may choose a relatively more accurate or trusted set of information when duplicate information is transmitted from the case 420 and the earbud 426. In other embodiments, the electronic device 400 merges, or combines, the respective data packets from the case 420 and the earbud 426. By merging the data, the electronic device 400 can receive data from the case 420 that is not transmitted by the earbud 426, and receive data that is transmitted by the earbud 426 and not transmitted by the case 420. In some embodiments, the determination whether to select data packets from one of the devices or generate merged data (e.g., merging the data packets) depends upon the state (e.g., open state, closed state) of the case 420 and the state (e.g., docked state, undocked state) of the earbud 426. This will be discussed further below.

When the case 420 and the earbud 426 are paired with each other and with the electronic device 400, an identifier can be established. For example, the case 420 and the earbud 426 include an identifier 446a and an identifier 446b, respectively. As a non-limiting example, each of the identifiers 446a and 446b may include a serial number. In some embodiments, identifiers 446a and 446b are the same. Additionally, the case 420 and the earbud 426 may include a media access control (MAC) address. For example, the case 420 and the earbud 426 include a MAC address 448a and a MAC address 448b, respectively. The MAC addresses 448a and 448b are unique to, i.e., different from, each other. The electronic device 400 may include a table 452 that identifies the device—case 420 or earbud 426—based upon matching the MAC address 448a and the MAC address 448b, respectively, with an expected MAC address for the device from the table 452.

In instances when the case 420 and the earbud 436 transmit one or more data packets that contain the same information, the case 420 also transmits the MAC address 448a and the earbud 426 also transmits the MAC address 448b. The electronic device 400 can receive the respective data packets from the case 420 and the earbud 426 that include the same information, and nonetheless can determine which device, the case 420 or the earbud 426, transmitted the data packets based upon the table 452, as well as MAC addresses 448a and 448b of the case 420 and the earbud 426, respectively. Beneficially, the electronic device 400 can distinguish respective information provided by the case 420 and the earbud 426. It should be noted that new identifiers and MAC addresses can be used should new cases or earbuds be used with the electronic device 400.

Additionally, the electronic device 400 may include data selection modules that monitor for data packets from different devices. For example, the electronic device 400 may include a data selection module 454a and a data selection module 454b. The data selection modules 454a and 454b may include a data selection algorithm that performs the steps of, for example, receiving one or more data packets from the case 420 and the earbud 426, determining the state of the case 420, and determining the state of the earbud 426. In some embodiments, the data selection modules 454a monitors the case 420 and the data selection modules 454b monitors the earbud 426. Based on the state information of the case 420a and the earbud 426, the data selection module 454a or the data selection module 454b can pass the one or more data packets from the case 420 or the earbud 426, respectively, used by the electronic device 400 to ultimately provide, on a display 404 of the electronic device 400, one or more notifications 408. Alternatively, the state information of the case 420a and the earbud 426 may cause the data selection modules 454a and 454b to merge together the one or more data packets from the case 420 and the earbud 426, and the electronic device 400 uses the merged information to generate the one or more notifications 408 to be presented on the display 404. The decision to select a data packet(s) from the case 420, from the earbud 426, or merge the data packets will be discussed further below.

The one or more notifications 408 may include a battery charge level of the battery 434b of the case 420 and/or the battery 434c of the earbud 426. Alternatively, or in combination, the one or more notifications 408 may include a charging state of the battery 434b of the case 420 and/or the battery 434c of the earbud 426. Additionally, the one or more notifications 408 may include a threshold, or minimum, battery charge level indication that the battery 434b is at a threshold battery charge level, indicating the battery 434b is at a minimum battery charge level needed to fully charge the battery 434c of the earbud 426 (and an additional battery of the additional earbud). Put another way, the threshold battery charge level indication provides an indication that, based on current battery charge level and charge capacity of the battery 434b of the case 420, the battery life of the battery 434b is such that any battery charge level of the battery 434b below the threshold battery charge level may not be available to fully charge the battery 434c of the earbud 426 (and the additional battery of the additional earbud). The threshold battery charge level also account for the battery capacities of the battery 434c of the earbud 426 (and an additional earbud battery). Accordingly, the one or more notifications 408 that includes the threshold battery charge level may be construed as an alert to charge the battery 434b of the case 420. As an example, when the battery 434b of the case 420 is at a battery charge level of 40%, the one or more notifications 408 may provide a low battery notification indicating the battery 434b has the minimum capacity available to guarantee a fully charge of the earbuds.

Referring to FIG. 5, a table 560 is shown that includes device policy for an electronic device. The device policy provides a rules-based decision for electronic devices described herein as to how to manage and process the data packets received from a case and from earbuds. The "earbud information" and the "case information" refer to information transmitted by the earbud and the case, respectively, to an electronic device for presentation on a display in the form of one or more notifications.

In Scenario 1 (corresponding to FIG. 3A), the case is in the open state (indicating the lid is open) and the earbuds are in the docked state (indicating the earbuds are located in the case). Each of the earbuds can transmit the earbud battery level (e.g., a current earbud battery charge level), case battery level (e.g., a current case battery charge level), the earbud charging state (e.g., whether the earbud battery is being charged or not being charged), the case charging state (e.g., whether the case battery is being charged or not being charged), and the case state (e.g., whether the case, or lid of the case, is open or closed). Additionally, the docked state of the earbud is also transmitted. As shown, the case can also transmit the same information as that of the earbuds. In response to the case state open and the earbud state being docked, the electronic device selects the earbud information provided by one or more of the earbuds, and uses the information to generate one or more notifications.

In Scenario 2 (corresponding to FIG. 3B), the case is in the open state and the earbuds are in the undocked state (e.g., the earbuds are located outside of the case). Each of the earbuds can transmit the earbud charging state. The case can transmit the case charging state and the case state. Additionally, the undocked state of the earbud is also transmitted. In response to the case state being open and the earbud state being undocked, the electronic device merges the earbud information and the case information, and uses the merged information from both devices to generate the one or more notifications.

In Scenario 3 (corresponding to FIG. 3C), the case is in the closed state (indicating the lid is closed) and the earbuds are in the docked state. As a result, the case can provide a command to power down the earbuds and accordingly, the earbuds do not transmit information. The case can transmit the earbud battery level, case battery level, the earbud charging state, the case charging state, and the case state. Additionally, the case also transmits the docked state of the earbud. By default, the electronic device selects the case information provided by the case, and uses the information to generate one or more notifications.

In Scenario 4 (corresponding to FIG. 3D), the case is in the closed state and the earbuds are in the undocked state. Each of the earbuds can transmit the earbud charging state and the earbud charging level. The case can transmit the case charging state, the case battery level, and the case state. Additionally, the undocked state of the earbud is also transmitted. In response to case state being closed and the earbud state being undocked, the electronic device merges the earbud information and the case information, and uses the merged information from both devices to generate the one or more notifications.

It can be seen that when the earbuds and the case transmit overlapping information in the form of the same type(s) of information, the electronic device can decide to select information from one device over the other. On the other hand, when the earbuds and the case transmit non-overlapping information in the form of the different information, the electronic device can decide to merge information from both devices.

Various examples of aspects of the disclosure are described below as clauses for convenience. These are provided as examples, and do not limit the subject technology.

Clause A: An electronic device, including: a memory device that stores instructions; radio circuitry configured to receive i) a first data packet from a case and ii) a second data packet from an earbud; and one or more processors that, in response to executing the instructions, causes the one or more processors to: obtain, from at least one of the first data packet and the second data packet, i) first state information related to the case and ii) second state information related to the earbud; and in response to receiving the first data packet and the second data packet, determine, based on the first state information and the second state information, whether to use the first data packet and/or the second data packet.

Clause B: An electronic device, including: a display configured to present a notification; a memory device that stores instructions; and one or more processors that, in response to executing the instructions, causes the one or more processors to: monitor for one or more first data packets provided by a case; monitor for one or more second data packets provided by an earbud; in response to the one or more first data packets having duplicate information with respect to the one or more second data packets, select, based on first state information of the case and second state information of the earbud, data from at least one of the one or more first data packets and the one or more second data packets; and generate, based on the selected data, the notification for presentation on the display.

Clause C: A case, including: case radio circuitry; a memory device that stores instructions; and one or more processors that, in response to executing the instructions, causes the one or more processors to: obtain a battery charge level of an earbud battery of an earbud, provide a command to the earbud that powers down earbud radio circuitry of the earbud; and transmit, using the case radio circuitry and while the earbud radio circuitry is powered down, the battery charge level of the earbud battery.

One or more of the above clauses can include one or more of the features described below. It is noted that any of the following clauses may be combined in any combination with each other, and placed into a respective independent clause, e.g., clause A, B, or C.

Clause 1: wherein: the first state information includes an open state of a lid of the case or a closed state of the lid, and the second state information includes docked state of the earbud within the case or an undocked state of the earbud.

Clause 2: wherein executing the instructions further causes the one or more processors to, in response to the first state information including the open state and the second state information including the docked state, select the second data packet.

Clause 3: wherein executing the instructions further causes the one or more processors to, in response to the first state information including the open state and the second state information including the undocked state: obtain, from the first data packet, first data; obtain, from the second data packet, second data different from the first data; and generate merged data that includes the first data combined with the second data.

Clause 4: wherein executing the instructions further causes the one or more processors to: obtain, from the first data packet, a first MAC address of the case; obtain, from the first data packet, a second MAC address of the earbud; and distinguish, from the merged data, the first data from the second data based on the first MAC address and the second MAC address.

Clause 5: wherein executing the instructions further causes the one or more processors to, in response to the first state information including the closed state and the second state information including the docked state, select the first data packet.

Clause 6: wherein executing the instructions further causes the one or more processors to obtain, from the first data packet, a current earbud battery charge level.

Clause 7: wherein executing the instructions further causes the one or more processors to, in response to the first state information including the open state and the second state information including the undocked state: obtain, from the first data packet, a case battery charge level of the case; obtain, from the second data packet, an earbud battery charge level; and merge the first data packet with the second data packet.

Clause 8: further including a display, wherein executing the instructions further causes the one or more processors to present the selected data as visual information on the display.

Clause 9: further including a display, wherein executing the instructions further causes the one or more processors to: obtain, from the first data packet, a minimum battery charge level indication of a case battery of the case, the minimum battery charge level indication corresponding to the case battery having a minimum amount of battery life available to fully charge the earbud battery and a second earbud battery of a second earbud, and present, on the display, a notification corresponding to the minimum battery charge level indication.

Clause 10: wherein executing the instructions further causes the one or more processors to obtain, from one of the first data packet and the second data packet, a key shared between the case and the earbud, wherein the key is configured to decrypt the first data packet and the second data packet.

Clause 11: wherein: the first state information includes an open state of a lid of the case or a closed state of the lid, and the second state information includes docked state of the earbud within the case or an undocked state of the earbud.

Clause 12: wherein executing the instructions further causes the one or more processors to, in response to the first state information including the open state and the second state information including the docked state, select the one or more second data packets as the selected data.

Clause 13: wherein executing the instructions further causes the one or more processors to, in response to the first state information including the open state and the second state information including the undocked state: obtain, from the one or more first data packets, first data that includes a case battery charge level of the case; obtain, from the one or more second data packets, second data that includes an earbud battery charge level; and obtain merged data that includes the first data combined with the second data.

Clause 14: further including: a case body including a cavity configured to receive the earbud; and a lid rotationally coupled to the case body, wherein executing the instructions further causes the one or more processors to, in response to the cavity receiving the earbud and the lid being in a closed state: provide the command to shut down the earbud radio circuitry; and provide the battery charge level of the earbud battery.

Clause 15: further including a case battery, wherein executing the instructions further causes the one or more processors to: charge, using the case battery, the earbud battery; and provide, using the case radio circuitry, a current earbud battery charge level of the earbud battery, the current earbud battery charge level corresponding to at least a near real-time battery charge level of the earbud battery.

Clause 16: wherein executing the instructions further causes the one or more processors to provide, using the case radio circuitry, one or more data packets including the current earbud battery charge level of the earbud battery and a current case battery charge level of the case battery.

Clause 17: wherein executing the instructions further causes the one or more processors to: receive, from the earbud, a key; and provide, using the case radio circuitry, the key to a device that receives the battery charge level.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

As used herein, the phrase "one of" preceding a series of items, with the term "and" or "or" to separate any of the items, is a selection of one of the items listed. By way of example, the phrase "one of A, B, and C" refers to only A, only B, or only C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An electronic device, comprising:
   a memory device that stores instructions;
   radio circuitry configured to receive i) a first data packet from a case and ii) a second data packet from an earbud; and
   one or more processors that, in response to executing the instructions, causes the one or more processors to:
      obtain, from at least one of the first data packet and the second data packet, i) first state information related to the case and ii) second state information related to the earbud; and
      in response to receiving the first data packet and the second data packet, determine, based on the first state information and the second state information, whether to use the first data packet and/or the second data packet.

2. The electronic device of claim 1, wherein:
   the first state information comprises an open state of a lid of the case or a closed state of the lid, and
   the second state information comprises docked state of the earbud within the case or an undocked state of the earbud.

3. The electronic device of claim 2, wherein executing the instructions further causes the one or more processors to, in response to the first state information comprising the open state and the second state information comprising the docked state, select the second data packet.

4. The electronic device of claim 2, wherein executing the instructions further causes the one or more processors to, in response to the first state information comprising the open state and the second state information comprising the undocked state:
   obtain, from the first data packet, first data;
   obtain, from the second data packet, second data different from the first data; and
   generate merged data that includes the first data combined with the second data.

5. The electronic device of claim 4, wherein executing the instructions further causes the one or more processors to:
   obtain, from the first data packet, a first MAC address of the case;
   obtain, from the first data packet, a second MAC address of the earbud; and
   distinguish, from the merged data, the first data from the second data based on the first MAC address and the second MAC address.

6. The electronic device of claim 2, wherein executing the instructions further causes the one or more processors to, in response to the first state information comprising the closed state and the second state information comprising the docked state, select the first data packet.

7. The electronic device of claim 6, wherein executing the instructions further causes the one or more processors to obtain, from the first data packet, a current earbud battery charge level.

8. The electronic device of claim 2, wherein executing the instructions further causes the one or more processors to, in response to the first state information comprising the open state and the second state information comprising the undocked state:
   obtain, from the first data packet, a case battery charge level of the case;
   obtain, from the second data packet, an earbud battery charge level; and
   merge the first data packet with the second data packet.

9. The electronic device of claim 1, further comprising a display, wherein executing the instructions further causes the one or more processors to present the data as visual information on the display.

10. The electronic device of claim 1, further comprising a display, wherein executing the instructions further causes the one or more processors to:
   obtain, from the first data packet, a minimum battery charge level indication of a case battery of the case, the minimum battery charge level indication corresponding to the case battery having a minimum amount of battery life available to fully charge a first earbud battery of the earbud battery and a second earbud battery of a second earbud, and present, on the display, a notification corresponding to the minimum battery charge level indication.

11. The electronic device of claim 1, wherein executing the instructions further causes the one or more processors to obtain, from one of the first data packet and the second data packet, a key shared between the case and the earbud, wherein the key is configured to decrypt the first data packet and the second data packet.

12. An electronic device, comprising:
a memory device that stores instructions; and
one or more processors that, in response to executing the instructions, causes the one or more processors to:
monitor for one or more first data packets provided by a case;
monitor for one or more second data packets provided by an earbud;
in response to the one or more first data packets having duplicate information with respect to the one or more second data packets, select, based on first state information of the case and second state information of the earbud, data from at least one of the one or more first data packets and the one or more second data packets; and
generate, based on the selected data, a notification for presentation on a display.

13. The electronic device of claim 12, wherein:
the first state information comprises an open state of a lid of the case or a closed state of the lid, and
the second state information comprises docked state of the earbud within the case or an undocked state of the earbud.

14. The electronic device of claim 13, wherein executing the instructions further causes the one or more processors to, in response to the first state information comprising the open state and the second state information comprising the docked state, select the one or more second data packets as the selected data.

15. The electronic device of claim 13, wherein executing the instructions further causes the one or more processors to, in response to the first state information comprising the open state and the second state information comprising the undocked state:
obtain, from the one or more first data packets, first data that includes a case battery charge level of the case;
obtain, from the one or more second data packets, second data that includes an earbud battery charge level; and
obtain merged data that includes the first data combined with the second data.

* * * * *